United States Patent Office 2,880,574
Patented Apr. 7, 1959

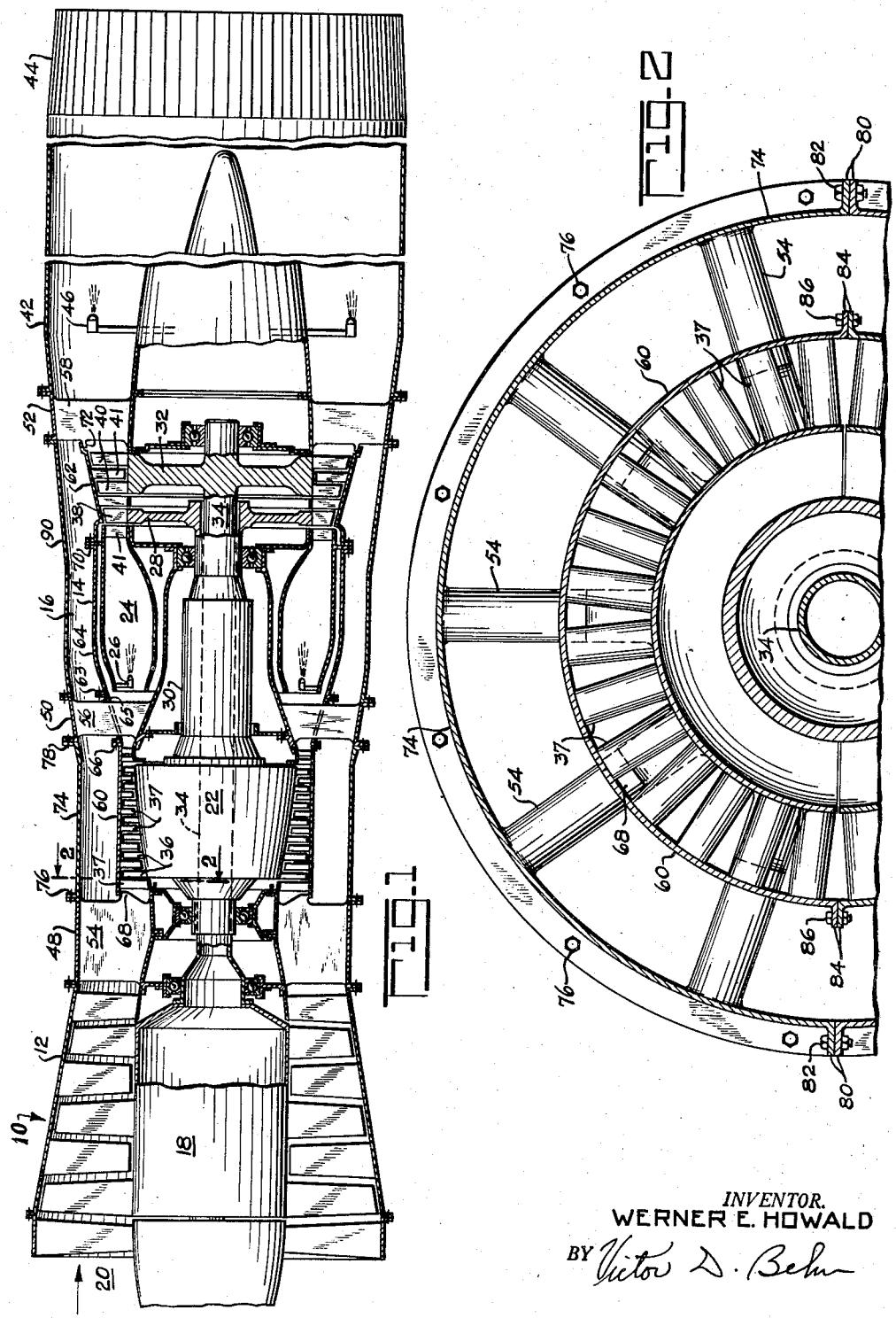

2,880,574

BY-PASS TURBO JET ENGINE CONSTRUCTION

Werner E. Howald, Ridgewood, N.J., assignor to Curtiss-Wright Corporation, a corporation of Delaware Application May 18, 1956, Serial No. 585,864

8 Claims. (Cl. 60—35.6)

This invention relates to gas turbine engines and is particularly directed to such engines for aircraft in which a portion of the air taken in by the engine is by-passed around the gas turbine combustion chamber and turbine for example as in a turbo fan engine.

As used herein a turbo fan engine comprises a turbo jet engine with its compressor, combustion chamber, turbine and means drivably connecting the turbine and compressor and in addition said engine includes a passage around the combustion chamber and turbine for by-passing a substantial portion of the compressor air therethrough, the by-pass air and turbine exhaust discharging rearwardly through an exhaust nozzle structure to provide forward propulsive thrust.

With such an engine the outer stator wall of the compressor, combustion chamber and turbine forms the inner wall for the annular by-pass air passage. Accordingly, during engine operation the inner wall of said annular by-pass air passage will run substantially hotter than the outer wall of said annular by-pass passage. An object of the present invention comprises the provision of such an engine with a novel housing construction in which means are provided to permit differential expansion between the inner and outer walls of said annular by-pass air passage. A further object of the invention comprises the provision of a housing construction for a turbo fan engine in which convenient access is provided to the compressor, turbine and/or combustion chamber of the engine.

Other objects of the invention will become apparent upon reading the annexed detailed description in connection with the drawing in which:

Fig. 1 is an axial sectional view through a turbo fan engine embodying the invention; and Fig. 2 is a sectional view taken along line 2—2 of Fig. 1.

Referring to the drawing, a turbo fan engine 10 is illustrated as comprising a housing structure having an outer shell 12 and an inner shell 14 concentrically supported within the shell 12 so as to leave an annular path 16 therebetween. A low pressure axial flow compressor 18 is journaled within the shell 12 forwardly of the inner shell 14. The compressor 18 receives air through the forwardly directed inlet 20 formed at the forward end of the shell 12. The compressor 18 delivers a portion of its air to the annular path 16 and the remaining portion to a high pressure axial flow compressor 22 journaled within the inner shell 14.

The high pressure compressor 22 supplies its air to an annular combustion chamber 24 where heat is added to said air by burning fuel in said chamber, said fuel being supplied by burner apparatus schematically indicated at 26. From the combustion chamber 24 the hot gases co-act with the blades of a high pressure turbine 28 for driving said turbine. A shaft 30 drivably connects the high pressure turbine 28 with the high pressure compressor 22. The hot gases exhausting from the high pressure turbine 28 co-act with the blades of a low pressure turbine 32 for driving the latter turbine. The low pressure turbine 32 is drivably connected to the low pressure compressor 18 by a shaft 34 extending co-axially through the shaft 30. The high pressure compressor 22, the combustion chamber 24 and turbines 28 and 32 provide an inner annular fluid path co-axial with and surrounded by the annular fluid path 16. The rotor and stator blades 36 and 37 of the high pressure compressor, the rotor blades 38 of the high pressure turbine, the rotor blades 40 of the low pressure turbine and the stator blades 41 of said turbines extend across their respective portions of said inner annular fluid path. From the low pressure turbine 32 the hot gases discharge into an exhaust duct 42 formed by a rearward extension of the outer shell 12 beyond the turbine assembly 28 and 32. The air supplied through the annular fluid path 16 by the compressor 18 also discharges into the duct 42. The exhaust duct 42 has a rearwardly directed variable area exhaust nozzle 44 at its rear end through which the air from the annular fluid path 16 and the hot gases from the turbine assembly discharge into the surrounding atmosphere whereby engine 10 is provided with forward propulsive thrust.

Fuel may also be added to the gases in the exhaust duct 42 for example from fuel nozzles 46 for combustion therein in order to increase the thrust output of the engine 10.

The engine housing includes three spoke-type units 48, 50 and 52 having bearing means within which the engine rotor structure is journaled. The housing unit 48 is disposed between the compressors 18 and 22 and has spokes 54 extending radially across the flow path of the air supplied by the low pressure compressor 18 to the annular path 16 and to the high pressure compressor 22. The housing unit 50 is disposed immediately downstream of the high pressure compressor 22 and has spokes 56 extending radially across the flow path of the compressed air delivered by the compressor 22 to the combustion chamber 24 and radially across the adjacent intermediate portion of the flow path 16. The housing unit 52 is disposed immediately downstream of the low pressure turbine 32 and has spokes 58 extending radially across the discharge end of the turbine 32 and the discharge end of the annular path 16.

The inner shell 14 includes annular shell units 60 and 62 and an intermediate shell structure 64. The intermediate shell structure 64 surrounds the combustion chamber 24 and has a bolted attachment, indicated at 63, to a flange member 65 which in turn is rigidly secured to the housing spokes 56, as by welding. The annular shell unit 60 surrounds the compressor 22 and forms the outer boundary for air being compressed thereby and forms a support for the stator blades 37 of said compressor. The downstream end of the annular shell unit 60 is connected to flange member 65 of the housing spokes 56, by a bolted connection indicated at 66. The housing spokes 54 have shelves or flanges 68 on their downstream sides and the upstream end of the annular shell unit 60 is piloted on the radially outer surfaces of the flanges 68 so as to support said end and at the same time permit axial sliding of said end relative to said spokes. The upstream end of the shell unit 62 is connected to the combustion chamber shell unit 64 by a bolted connection indicated at 70 whereby said shell unit 64 supports the adjacent end of the unit 62 from the spokes 56 and the shell units 62 and 64 together form the outer boundary for the combustion gases and the turbine motive fluid. The housing spokes 58 have shelves or flanges 72 on their upstream sides and the downstream end of the annular shell unit 62 is piloted on the outer surface of said flanges 72 whereby the flanges 72 support the adjacent end of the shell 62 and at the same time permit axial sliding of said end relative to the spokes 58.

The outer shell 12 comprises a plurality of cylindrical sections removably secured together. Thus the shell 12 includes a cylindrical shell section 74 disposed about the annular shell unit 60. One end of the section 74 is rigidly but removably bolted to the outer shell portion of the housing spoke unit 48 as indicated at 76 and the other end of the section 74 is similarly bolted to the outer shell portion of the spoke unit 50, as indicated at 78. The cylindrical section 74 is split into two semi-cylindrical halves having end flanges 80 which are removably bolted together as indicated at 82 (Fig. 2). Similarly the annular shell unit 60 is split into two semi-cylindrical halves having end flanges 84 which are removably bolted together as indicated at 86. Also the annular shell unit 60 is somewhat shorter axially than the outer cylindrical shell section 74 surrounding said unit and the shell unit 60 and outer section 74 are disposed so that the ends of the outer section 74 extend axially beyond the ends of the shell unit 60. With this construction the outer shell section 74 can be removed one half at a time whereupon the inner shell unit 60 can be removed one half at a time through the opening left upon removal of the outer shell section 74. In this way although the by-pass passage 16 surrounds the high pressure compressor 22 the stator of said compressor can be removed and/or replaced without first completely disassembling one end of the engine. Removal of the stator of compressor 22 provides access to the compressor rotor blades also without completely disassembling the engine. In addition because of the axial freedom of one end of the shell unit 60, differential thermal expansion, or contraction of said shell unit and the section 74 of the outer shell of the engine simply results in sliding movement of the adjacent end of the shell unit 60 on the flanges 68 of the housing spokes 54. This axial sliding freedom of one end of the shell unit 60 avoids the high stresses which would otherwise be produced by such differential expansion or contraction of said unit and the outer shell of the engine.

The outer shell 12 also includes a cylindrical section 90 rigidly but removably bolted at its ends to the outer shell portions of the spoke-type housing units 50 and 52 and like the section 74 the section 90 is split into two semi-cylindrical halves removably bolted together. The annular shell unit 62 forms the outer boundary for the turbine motive fluid and forms a support for the stator blades of the turbines 28 and 32. The annular shell unit 64 surrounds the combustion chamber 24. Like the annular shell unit 60, both the annular shell units 62 and 64 are split into two semi-cylindrical halves removably bolted together. In addition the two shell units 62 and 64 together are shorter than the outer cylindrical section 90 and the ends of the outer shell 90 extend axially beyond the ends of the composite inner shell 62 and 64. Accordingly like the stator assembly for the high pressure compressor 22, the stator assembly supported by the shell 62 can be removed, one-half at a time, through the opening left in the housing shell 12 upon removal of the outer shell section 90. In this way the stator assembly with the stator blades 41 for the turbines 28 and 32 can be removed without first disassembling one end of the engine and at the same time access is provided to the turbine rotor blades 38 and 40. Removal of the outer shell section 90 also permits removal, one half at a time, of the intermediate inner shell unit 64 surrounding the combustion chamber 24, thereby providing access to the structure of said chamber. Also the axial sliding freedom of one end of the stator shell 62 on the flanges 72 avoids the high stresses which would otherwise be induced by differential expansion or contraction of the inner shells 62 and 64 and the outer shell 90 of the engine.

The stator shell structure 60 for the compressor 22 and the combined stator shell structures 62 and 64 for turbine assembly 28, 32 and combustion chamber 24 are accessible in essentially the same manner and both said shell structures have an axial sliding freedom at one end to permit axial sliding movements of said ends relative to the adjacent housing structure of the engine. The invention however is not limited to the provision of all these features in a particular engine.

While I have described my invention in detail in its present preferred embodiment, it will be obvious to those skilled in the art, after understanding my invention, that various changes and modifications may be made therein without departing from the spirit or scope thereof. I aim in the appended claims to cover all such modification.

I claim as my invention:

1. In a gas turbine engine, the combination comprising elastic fluid apparatus having a bladed rotor member forming the inner boundary for at least a portion of a fluid flow path of said apparatus and across which the rotor blades of said member extend; a first annular shell structure forming the outer boundary for said fluid flow path portion; a second annular shell structure disposed about and spaced outwardly from said first shell structure to form a second annular fluid flow path therebetween; first and second support means disposed upstream and downstream respectively of said apparatus; means connecting the ends of said second annular shell structure to said first and second support means; means connecting one end of said first shell structure to one of said support means; and means on the other of said support means for supporting the other end of said first shell structure so as to permit axial sliding movements of said latter end relative to said latter support means.

2. The combination recited in claim 1 in which said second annular shell structure comprises two semi-cylindrical halves removably secured together to permit said shell structure to be removed to provide access to said first annular shell structure, and said first annular shell structure is axially shorter than said second annular shell structure and comprises two semi-cylindrical halves removably secured together to permit removal of said first shell structure through the opening formed upon removal of said second shell structure.

3. A gas turbine engine comprising an air compressor; combustion apparatus disposed to receive air from said compressor for combustion; turbine means drivably connected to said compressor and disposed to receive turbine motive fluid for said combustion apparatus; a first annular shell structure surrounding said compressor, combustion apparatus and turbine; a second annular shell structure disposed about and spaced outwardly from said first annular shell structure to form an annular fluid flow path therebetween; spaced first and second support means; means connecting said second shell structure to said spaced support means; means connecting one end of said first shell structure to one of said spaced support means; and means on the other of said spaced support means for supporting the other end of said first shell structure so as to permit axial sliding movements of said latter end relative to said latter support means.

4. A gas turbine as recited in claim 3 in which each of said first and second annular shell structures comprises removable semi-cylindrical halves.

5. A gas turbine engine comprising first and second air compressors; combustion apparatus disposed to receive air from said second compressor for combustion; turbine means drivably connected to said first and second compressors and disposed to receive motive fluid from said combustion apparatus; a first annular shell structure surrounding said second compressor; combustion apparatus and turbine; a second annular shell structure disposed about and spaced outwardly from said first shell structure to form an annular fluid flow path therebetween; said first compressor being disposed to deliver air to said annular fluid path and to said second compressor means; first support means having spokes extending radially across the flow path of the air delivered by said first compressor to said fluid path and to said second compressor and having their outer ends rigidly connected to the adjacent portion of said second shell structure; second support means having radially extending spokes disposed between said second compressor and turbine means and extending radially across said fluid path intermediate its ends and having their outer ends rigidly connected to the adjacent portion of said second shell structure; third support means having spokes extending radially across the discharge end of said turbine means and the adjacent portion of said fluid path and having their outer ends rigidly connected to the adjacent portion of said second shell structure, said first annular shell structure having a first portion disposed about said second compressor; means connecting one end of said shell structure first portion to one of said first and second support means; means on the spokes of the other of said first and second support means for supporting the other end of said first shell structure first portion so as to permit axial sliding movements of said latter and relative to its associated support means, said first annular shell structure also having a second portion disposed about said turbine means; means connecting one end of said shell structure second portion to one of said second and third support means; and means on the spokes of the other of said second and third support means for supporting the other end of said shell structure second portion so as to permit axial sliding movement of said latter end relative to its associated support means.

6. The combination recited in claim 5 in which said second portion of the first annular shell structure also is disposed about said combustion apparatus.

7. The combination recited in claim 5 in which said second annular shell structure comprises a first section disposed between and removably secured to said first and second support means and a second section disposed between and removably secured to said second and third support means, each of said first and second sections comprising two semi-cylindrical halves removably secured together to permit said section to be removed to provide access to the adjacent portion of said first annular shell structure; and said first and second portions of said first annular shell structure are axially shorter than said first and second sections, respectively of said second shell structure and each comprises two semi-cylindrical halves removably secured together to permit removal of said first and second portions of said first shell structure upon removal of the first and second sections of the second shell structure.

8. A gas turbine engine housing construction comprising a first annular shell structure forming the outer boundary for a first annular fluid path; a second annular shell structure disposed about and spaced outwardly from said first shell structure to form a second annular fluid path therebetween; first and second support means disposed at the upstream and downstream ends respectively of said shell structures; means connecting the ends of said second annular shell structure to said first and second support means; means connecting one end of said first shell structure to one of said support means; and means on the other of said support means for supporting the other end of said first shell structure so as to permit axial sliding movements of said latter end relative to said latter support means, said second annular shell structure comprising two semi-cylindrical halves removably secured together to permit said second annular shell structure to be removed to provide access to said first annular shell structure, and said first annular shell structure being axially shorter than said second annular shell structure and comprising two semi-cylindrical halves removably secured together to permit removal of said first shell structure through the opening formed upon removal of said second shell structure.

References Cited in the file of this patent
UNITED STATES PATENTS 2,670,600     Owner et al. _____ Mar. 2, 1954